US007836047B2

(12) United States Patent
Bourland, II et al.

(10) Patent No.: US 7,836,047 B2
(45) Date of Patent: Nov. 16, 2010

(54) METHOD FOR ASSIGNMENT OF POINT LEVEL ADDRESS GEOCODES TO STREET NETWORKS

(75) Inventors: Freddie J. Bourland, II, Longmont, CO (US); Kevin F. Cartin, Boulder, CO (US); Berkley R. Charlton, Frederick, CO (US); David J. Logan, Westminster, CO (US); Keith R. Searight, Louisville, CO (US); Catherine J. Loher, Arvada, CO (US)

(73) Assignee: Pitney Bowes Inc., Stamford, CT (US)

( * ) Notice: Subject to any disclaimer, the term of this patent is extended or adjusted under 35 U.S.C. 154(b) by 345 days.

(21) Appl. No.: 11/953,944

(22) Filed: Dec. 11, 2007

(65) Prior Publication Data

US 2009/0150393 A1 Jun. 11, 2009

(51) Int. Cl.
*G06F 7/00* (2006.01)
*G06F 17/30* (2006.01)
(52) U.S. Cl. ........................ 707/724; 707/919
(58) Field of Classification Search .................. 707/724
See application file for complete search history.

(56) References Cited

U.S. PATENT DOCUMENTS

2003/0225725 A1* 12/2003 Miller et al. .................. 707/1

2007/0156753 A1* 7/2007 Bourland et al. ......... 707/104.1

OTHER PUBLICATIONS

Daniel W. Goldberg, John P. Wilson, Craig A. Knoblock. From Text to Geographic Coordinates: The Current State of Geocoding, Jul. 31, 2006, http://www.urisa.org/goldberg.*

* cited by examiner

*Primary Examiner*—Luke S. Wassum
*Assistant Examiner*—Nicholas E Allen
(74) *Attorney, Agent, or Firm*—Michael J. Cummings; Angelo N. Chaclas

(57) ABSTRACT

Assignment of point level address geocodes to street networks include the steps of entering address data and collecting candidate point data records and segment data record matches for the entered address. Each point data record includes address elements and also includes a geocode. Each segment data record includes a centerline between segment record data points. A determination is made if there is at least one point data record match for the input address. The best point record match for the input address is selected when at least one point data record match is made. The address elements from the point record are compared to any collected segment data records. A determination is made of the best segment record match to the selected best point record and the best segment record match is selected. The selected best segment record is employed and the bearing and distance from the selected best point record is calculated to a point on the centerline of the selected best segment record to determine a geocode for the centerline point.

15 Claims, 3 Drawing Sheets

| CANDIDATE LIST ||||||||
|---|---|---|---|---|---|---|---|
| RANGE | NAME | SUFFIX | CITY | STATE | ZIP | SCORE | TYPE |
| 123 | MAPLE | ST | BOULDER | CO | 80301 | 2 | PT |
| 101-199 | MAPLE | ST | BOULDER | CO | 80301 | 2 | ST |
| 101-149 | MAPLE | Ln | BOULDER | CO | 80301 | 2 | ST |
| 101-199 | MAPLETON | ST | BOULDER | CO | 80301 | 17 | ST |
| 101-159 | MAPLETON | CT | BOULDER | CO | 80301 | 17 | ST |
Input address: 123 MAPLE, BOULDER, CO 80301
FIG. 2
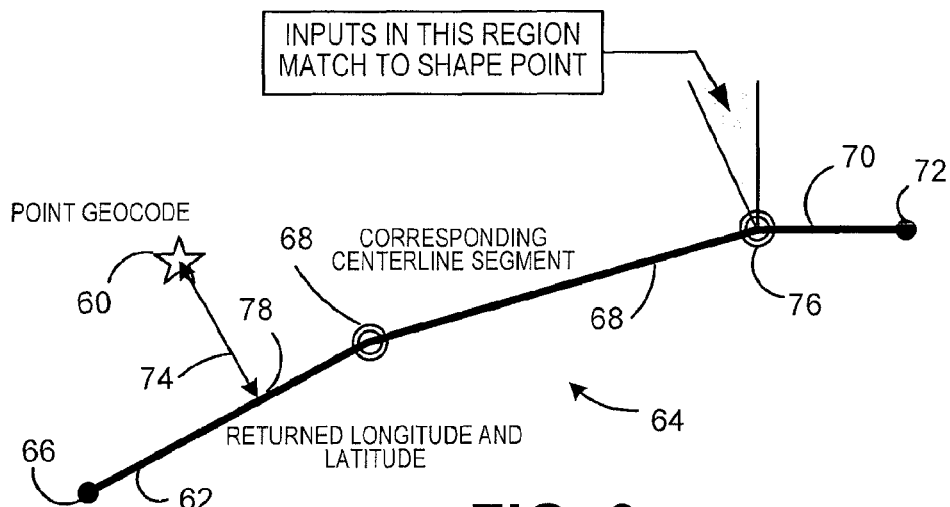
FIG. 3
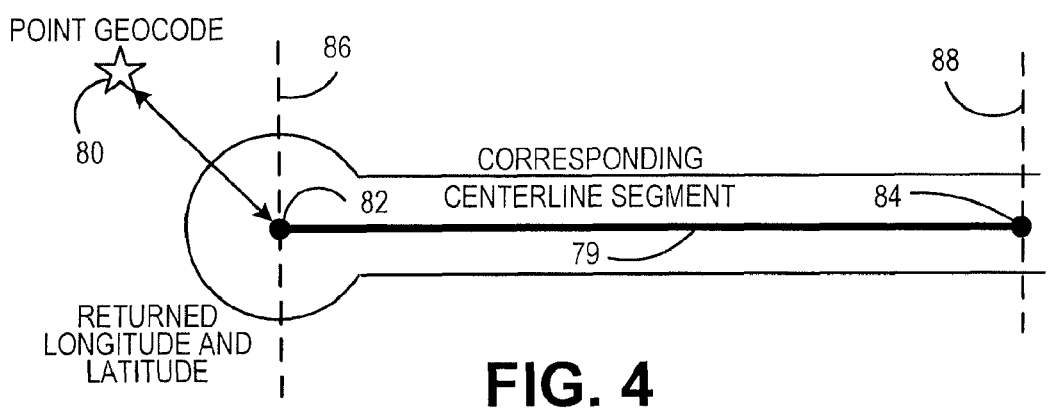
FIG. 4

METHOD FOR ASSIGNMENT OF POINT LEVEL ADDRESS GEOCODES TO STREET NETWORKS

FIELD OF THE INVENTION

The present invention relates to geocoding and more particularly to a method for assignment of point level address geocodes to street networks.

BACKGROUND OF THE INVENTION

Systems have been developed that employ two geocoding data sets to attempt to provide the correct latitude and longitude as well as street when a given address for a specific location. These systems are employed where the geographic location of an address is needed, for example, to determine the address for purposes of routing and dispatch to the address.

The geocoding data sets are processed by a geocoding engine. This is a specialized matching engine that utilizes a textual representation of an address as input. The engine matches the address against a data set of geographic data and uses algorithms to determine the location of the input address. The engine returns the location as a coordinate (longitude-latitude pair) referred to as a geocode and, depending on the particular system, may also return a more complete and accurate address based on an address hygiene function.

Geocoding data sets used for the above purposes include point level or parcel level geographic data sets and centerline geographic data sets. Point level or parcel level data sets are data sets where a single latitude and longitude is provided in each point level record for a specific address. Centerline data sets are data sets where a centerline is provided, such as for a street, and represents a range of addresses on the street. Interpolation is employed to relate the centerline to a specific address to establish a single latitude and longitude. Each segment record contains end points for the segment and may also contain shape points the help provide information about the shape of the segment by providing sub-segment information where a straight line between the two segment end points does not sufficiently reflect the actual street shape. A series of street segments in a given area reflect the street network for that area.

Address geocoding systems employ methods that now use both point and street centerline data sets. The geocodes from point datasets are more accurate since they locate a property exactly. However, there are problems in which it is necessary to obtain a geocode on the centerline of the proper adjacent street. Examples include routing and dispatching problems. The current method of returning a street centerline geocode is to interpolate the address location based on a potential range of addresses on the street. This technique returns values that may not match the ground truth represented by the point level data.

Actual ranges of addresses on a street are often different from potential ranges of addresses on a block face reflected in segment data records. One refinement to the interpolation process is to replace the original range of addresses with the true range based on the point level data. This process works well for house numbers that are placed uniformly and rationally along the street. However many examples exist where simply correcting the address range will not suffice since the segment address range may differ from the actual address range or not exist as may be the case, for example, with parks and certain commercial installations.

The problem may be further compounded because although a geocode is very accurate in terms of positioning, the accurate nature may introduce issues when these point geocodes are utilized in some solutions, for example in routing and dispatch applications. The inability to tie a point geocode to its parent street segment is a major issue. This impacts routing and dispatch applications as they rely on the street network underlying the point data and cannot determine which street is the parent street segment for a given point. Solutions therefore may end up in an ambiguous routing or dispatch situation where accurate routes or directions cannot be created due to the vagaries inherent in using a point geocode.

Approaches have been developed that project the point geocodes onto the street centerlines. One technique projecting from a point dataset is to take the point geocode and then search for the closest street segment and compute the projection on that segment. Unfortunately, geographic searches such as this can be time consuming. In addition, a purely geographic search is subject to error since many locations are closer to neighboring centerlines than to the street on which their address matches.

SUMMARY OF THE INVENTION

The described method improves accuracy in identifying appropriate street centerlines for applications involving assignment of point level address geocodes to street networks.

The method is appropriate for applications involving assignment of point level address geocodes to street networks that are identified at runtime instead of being built into stored data ahead of time.

The method also provides flexibility where appropriate street centerlines for applications involving assignment of point level address geocodes to street networks can be computed employing any mixture of street centerlines and point data, even with heterogeneous datasets, that is data sets of different vendors which may not be fully consistent with each other. The method may reduce ambiguity in identifying appropriate street centerlines for applications involving assignment of point level address geocodes to street networks.

The preferred method for assignment of point level address geocodes to street networks embodying the present invention includes the steps of entering address data and collecting candidate point data records and segment data record matches for the entered address. Each point data record includes address elements and also includes a geocode. Each segment data record includes a centerline between segment record data points. A determination is made if there is at least one point data record match for the input address. The best point record match for the input address is selected when at least one point data record match is made. The address elements from the point record are compared to any collected segment data records. A determination is made of the best segment record match to the selected best point record and the best segment record match is selected. The selected best segment record is employed and the bearing and distance from the selected best point record is calculated to a point on the centerline of the selected best segment record to determine a geocode for the centerline point.

BRIEF DESCRIPTION OF THE DRAWINGS

Reference is now made to the various figures wherein like reference numerals designate similar items in the various view and in which:

FIG. 2 is a chart of available data for the assignment process shown in FIG. 1 helpful in understanding the present invention depicting a candidate list for a given input address with a returned point data geocode and a candidate street geocodes along with all potential candidate street geocodes.

FIG. 3 is a schematic diagram helpful in understanding the assignment of point level address geocodes to street networks shown in FIG. 1, illustrating where the closest point on a corresponding centerline segment is interior to the centerline segment;

FIG. 4 is a schematic diagram helpful in understanding the assignment of point level address geocodes to street networks shown in FIG. 1, illustrating cul de sac geocoding;

DETAILED DESCRIPTION OF THE PREFERRED EMBODIMENT

Figure 1:
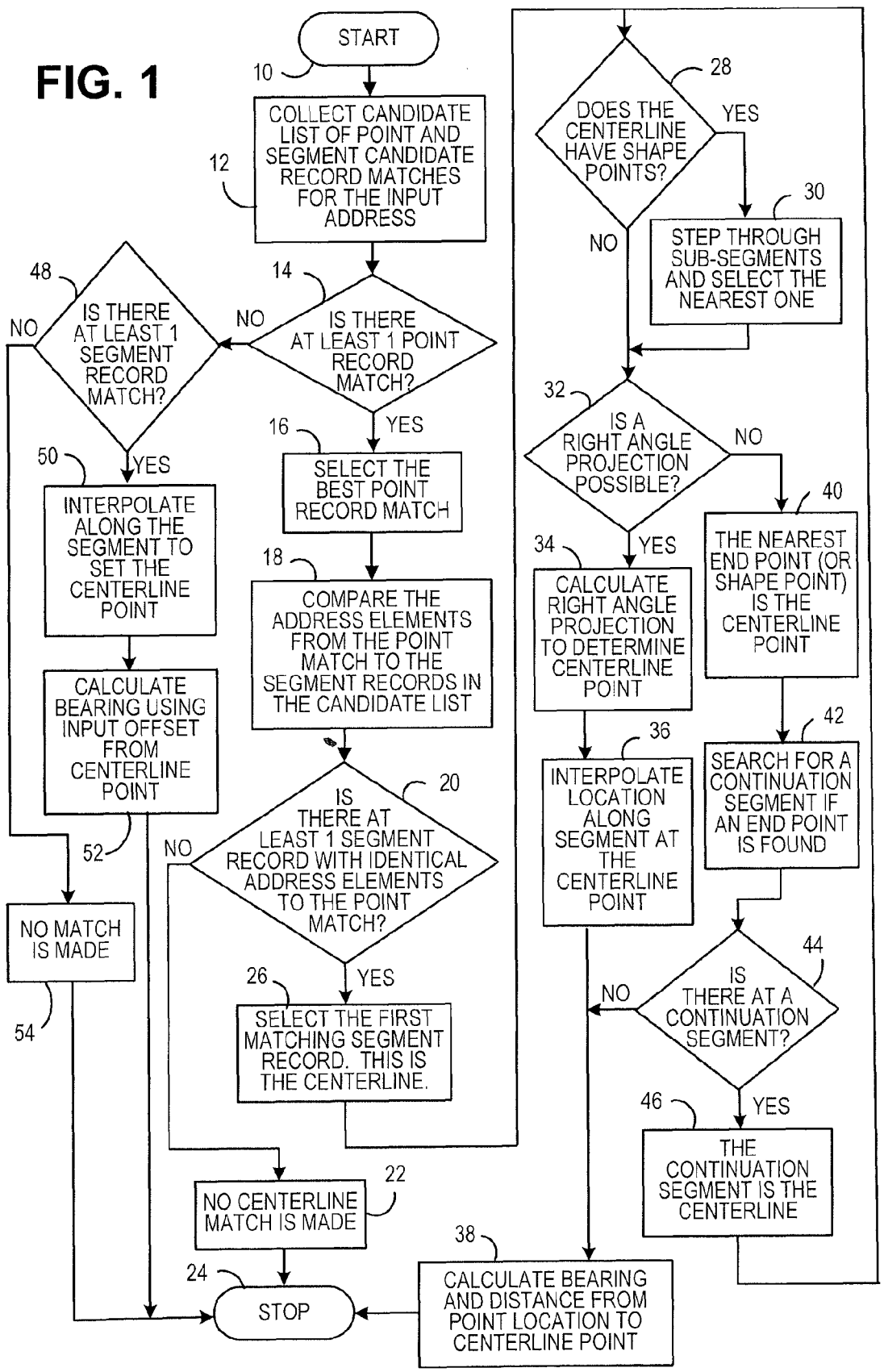
FIG. 1 is a is a flow chart of a the assignment of point level address geocodes to street networks embodying the present invention.

Reference is now made to FIG. 1. The flow chart illustrates the assignment of point level address geocodes to street networks. A solution is created that will enable a calling application to realize a latitude—longitude that lies on the centerline of the proper adjacent street segment. This will tie the point data back to the underlying street data set and allow integration with street-dependent solutions. To remove the ambiguity from these applications, the process enables, for example, a calling application to realize a latitude—longitude that lies on the centerline of the parent street segment. This will tie the point data back to the underlying street data set and allow integration with street-dependent solutions. A fast and accurate method is implemented to find the geocode on the street centerline that can be utilized in real time. By making the process dynamic, the method will work on any appropriate mix of point data and centerline data sets, even in the situation where the datasets are provided by different data vendors (i.e., heterogeneous data).

The process starts at block 10 with the input of an address. The address can be input from various sources including a keyboard or a calling application, not shown. At block 12, candidate lists of point and segment candidate records matches for the input address are collected. The records are collected from available point level address data bases containing point data records and segment level data bases containing segment data records. A determination is made at decision block 14 if there is at least one point record match. If there is at least one point record match, the process continues at block 16 and the best point record match is selected. The address elements from the point match are compared to the to the segment records in the candidate list at block 18. The segment records contain data points and centerline information between the data points. These data points can be end points of the segment and also shape points along the segment centerline between the segment end points. The shape points help show the actual shape of a street with sub-segments when the actual shape of the street is not a straight line between the two segment end points.

A determination is made at decision block 20 if there is at least one segment record with identical address elements to the point match. If there is not at least one segment record with identical address elements, no center line match is made at block 22 and the process stops at block 24. The data reflecting no match being made may be output to an output device or utilized in another application such as a calling application. However, when there is at least one such segment record, the process continues and the first matching segment record is selected at block 26.

A further determination is made at decision block 28 if the center line has shaped points. If the center line has shaped points, the process continues at block 30 with a step through of the sub-segments and the selection of the nearest sub-segment. Where there are no shaped points or after a step-through of the sub-segments at block 30, a determination is made at block 32 if a right angle is possible. That is, a determination is made whether is possible to make a right angle projection, a line, from the point record location point, the coordinates of the latitude and longitude of the address, to intersect the centerline of the segment or nearest sub-segment at a right angle. When a right angle is possible, the right angle projection is calculated at block 34 to determine the center line point and at block 36, the location along the segment at the center point is interpolated. Then, the process continues, where at block 38 the bearing and the distance from the point location to the center point is calculated at block 38. The process then stops at block 24, as in the previous situation. The bearing and distance data may be output to an output device or utilized in another application.

Where, at decision block 32, a right angle projection is not possible, the process branches to block 40, where the nearest end point or shape point, if that is the case, is determined as the center line point. The process then continues at block 42, where a search is made for a continuation segment if an end point is determined as the centerline point. The search for a continuation segment at block 42 is limited to a search only when an end point is found as the nearest point. Where a shape point is found, the shape point is used as the centerline point.

A determination is made at decision block 44 if there is a continuation segment. Where there is a continuation segment, the continuation segment is determined as the center line at block 46 and the process loops back to decision block 28 and the process beginning at decision block 28 is repeated for the continuation segment. Where, however, there is no continuation segment, at decision block 44, the bearing and distance from the point location is calculated to the center point at block 38, and point or shape point as the case may be, and the process stops at block 24. Again, the bearing and distance data may be output to an output device or utilized in another application.

Now, returning to decision block 14, where there is no point record match, the process branches to decision block 48, where a determination is made if there is at least one segment record match. The best segment match to the input address is selected. Where there is at least one segment record match, at block 50, interpolation along the selected best segment is implemented to set the center line point. A bearing using the input offset from the center line point is calculated at block 52. The process then stops at block 24. Where there is no segment match at decision block 48, the process branches to block 54, where no match is made and the process then stops at block 24. In either case when the process stops at block 24, the relevant data may be output to an output device or utilized in another application.

In the above manner, the process has combined both centerline and point data to return the best centerline point location adjacent the point data address being processed. Moreover, the process enables the return of the best possible centerline point even when no point data is available and, further, enables the combination of both center line and point data on the fly, rather than having to pre-compute and store this type of information. The operation of the process as described above results in the determination of a centerline point when the process stops at block 24, except when no segment record match is made (block 48). The calculation of the bearing and distance from the address location to the centerline point is made either using the address offset from the centerline point (block 52) or using the calculated distance (bock 38). Accordingly, the process enables the determination to be made dynamically and in real time when the information is needed such as for routing or delivery applications.

FIGS. 2-6 provide examples of how the process shown in FIG. 1 operates in some specific typical situations.

Reference is now made to FIG. 2 depicting a candidate list for a given input address shown at 49. The candidate list includes a returned point data geocode shown at 51 and candidate street geocodes shown at 53 along with all potential candidate street geocodes shown at 54, 56 and 58. The chart depicts a candidate list for a given input address 49 as "123 Maple, Boulder, Colo. 80301", with a single returned point data geocode 51 and a single candidate street geocodes 53, along with all potential candidate street geocodes 54, 56 and 58. This information for the input address is collected from point level and street segment level data bases.

The list may be constructed employing cascading logic which produces a list of addresses based on both point and street centerline data. Functionality is provided to compare address elements of the point data geocode with all other selected candidates to match to the proper adjacent street centerline segment. This solution assumes that a corresponding street segment will be selected as a candidate and be present in the list of FIG. 2. Exception cases do exist, especially in the case of heterogeneous data, and are addressed via return codes where no corresponding street segment will be selected as a candidate for the input address. Return codes allow the calling process to return information to the user describing the assignment or lack of assignment. If a point data geocode is returned, then the functionality of the process will cause system to examine the current candidate list for matches to the point data as explained above.

In the situation presented of all potential candidate street geocodes for the input address 49, "123 Maple, Boulder, Colo. 80301", only one of the street geocodes 53 has an identical match to the returned point geocode 51. Even though two street geocodes 53 and 54 are possible and are scored the same by the geocoding scoring engine (each having a score of 2), the identical street geocode to the returned point geocode is selected for further processing. A geocoding scoring engine is computer processing operation that evaluates and rates, scores for the best possible match to an input address based on predetermine criteria, possible geocode matches to an input address which may be a partial address. Thus street geocode candidate 53, "101-199 Maple St Boulder, Colo. 80301", is selected a the match for the returned point geocode 51, "123 Maple St Boulder, Colo. 80301", of the input address "123 Maple, Boulder, Colo. 80301".

Reference is now made to FIG. 3. A point geocode 60 is perpendicular to a sub-segment 62 of a segment shown generally as 64. The sub-segment 62 is between an end point 66 and a shape point 68. There are three centerline sub-segments, 62, 68 and 70, between the two end points 66 and 72. The process selects the centerline sub-segment, here sub-segment 62 on which a perpendicular line 74 can be generated from the point geocode 60 to the sub-segment centerline in accordance with the process shown in FIG. 1. The intersection is centerline point 78. The location of point 78 can be interpolated using information from segment 64 record and the distance and bearing from the point geocode 60 to the centerline point 78 calculated. If the point geocode 60 were in the shaded area adjacent shape point 76, the point on the centerline of street segment 64, would be the shape point 76 and the distance and bearing from the point geocode 60 to the shape point 76 calculated.

Reference is now made to FIG. 4. illustrating a cul de sac situation. Here, the point data geocode 80 falls outside of the boundaries of a street segment 79 defined by the street segment end points 82 and 84 and their perpendiculars 86 and 88. The distance and bearing from the point data geocode 80 to the nearest data point for the segment from the point data, here end point 82, is calculated and will be provided as output information subject to verifying that there as no extension segments are present as are illustrated in FIGS. 5 and 6 described below.

Figure 5:
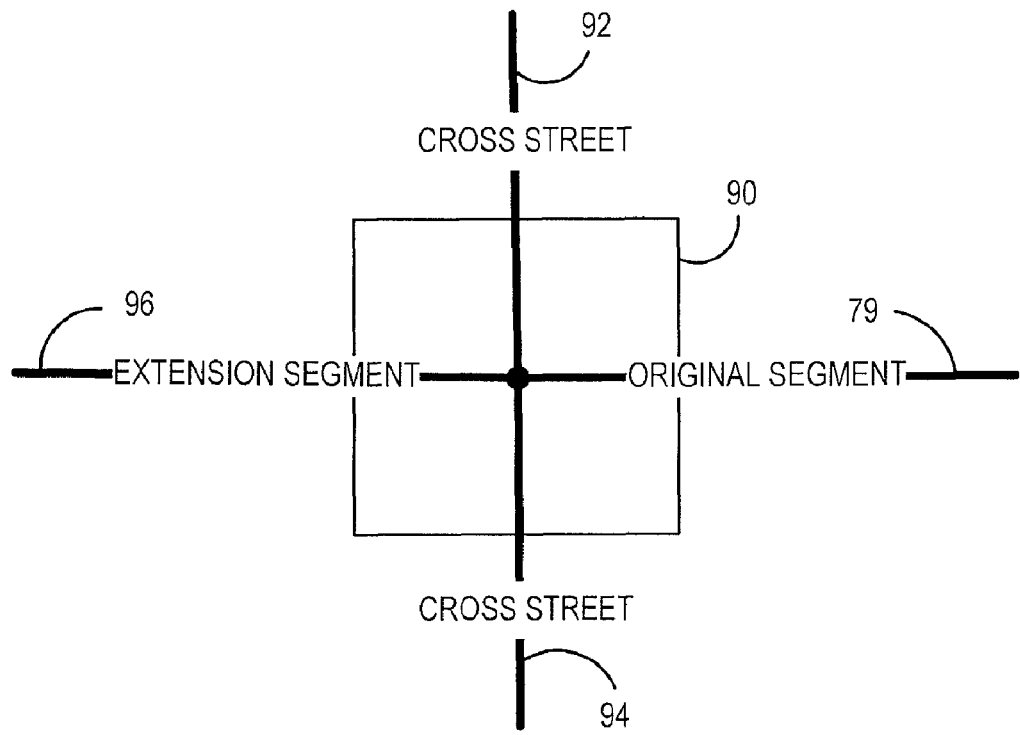
FIG. 5 is a schematic diagram helpful in understanding the assignment of point level address geocodes to street networks shown in FIG. 1, illustrating searching for adjacent centerline segments when the point geocode is closest to an endpoint; and, FIG. 6 is a schematic diagram helpful in understanding the assignment of point level address geocodes to street networks shown in FIG. 1, illustrating computing a geocode on an extension segment.
Figure 6:
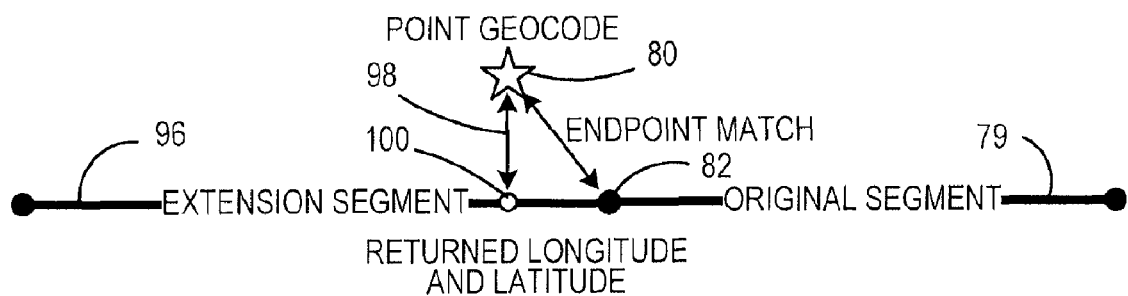

Reference is now made to FIG. 5. illustrating a search for adjacent centerline segments when the point geocode is closest to an endpoint as shown in FIG. 4. In the case when the point geocode matches to the endpoint such as end point 82 of the adjacent street segment 79, a determination is made whether the geocode is on a cul de sac or street terminus as shown in FIG. 4 or is on a continued adjacent street centerline segment as is shown in FIG. 6. To determine this, an area, for example, the small rectangle 90 around the end point 82 is computed around the endpoint 82 of the centerline segment 79 and a geographic search is performed to find all other street centerline segments that intersect with the initial adjacent centerline. As shown in FIG. 5, additional segments have been identified, specifically cross street segments 92 and 94 and extension segment 96.

If a continuation of the street is found, an extension segment such as street segment 96, then the process as described in connection with FIG. 1 is implemented using the extension segment. The process, shown in FIG. 6, selects the centerline extension segment 96 on which a perpendicular line 98 can be generated from the point data geocode 80 to the centerline of the extension segment. The intersection is centerline point 100. The location of point 100 can be interpolated using information from extension segment 96 record and the distance and bearing from the point geocode 80 to the centerline point 100 calculated. Where no extension segment been identified, then the distance and bearing from the point data geocode 80 to end point 82 is calculated and provided as output information as described above in connection with FIG. 4.

While the present invention has been described in connection with what is presently considered to be the most practical and preferred embodiments, it is to be understood that the invention is not limited to the disclosed embodiment, but, on the contrary, is intended to cover various modifications and equivalent arrangements included within the spirit and scope of the appended claims.

What is claimed is:

1. A method for assignment of point level address geocodes to street networks, comprising the steps of:
receiving address data for processing;
collecting candidate point data record and segment data record matches for said received address, each said point data record including address elements and a geocode and each said segment data record including a centerline between segment record data points for a street;

selecting a best point record match for said received address when at least one point data record match is made;

selecting a best segment record match to said selected best point record; and, employing said selected best segment record and calculating a bearing and distance from said selected best point record to a point on said centerline of said selected best segment record to determine a geocode for a centerline point of the street.

2. A method for assignment of point level address geocodes to street networks as defined in claim 1 wherein said step of employing includes the further steps of:

determining if a right angle projection is possible from said selected best point record to a point on said centerline of said selected best segment record; and, interpolating the location of said centerline point along said selected best segment record if a right angle projection is possible from said selected best point record to a point on said centerline of said selected best segment record.

3. A method for assignment of point level address geocodes to street networks as defined in claim 2 wherein said interpolated location is used as said point on said centerline of said selected best segment record.

4. A method for assignment of point level address geocodes to street networks as defined in claim 1 wherein said step of employing includes the further steps of:

determining if said selected best segment record contains shape points which define sub-segments of said selected best segment record;

selecting said sub-segment of said selected best segment record nearest to said selected best point record if said selected best segment record contains shape points which define sub-segments of said selected best segment record;

determining if a right angle projection is possible from said selected best point record to a point on said centerline of said selected best sub-segment record; and, interpolating a location of said centerline point along said selected best segment record sub-segment if a right angle projection is possible from said selected best point record to a point on said centerline of said selected best sub-segment record.

5. A method for assignment of point level address geocodes to street networks as defined in claim 4 wherein said interpolated location is used as said point on said centerline of said selected best segment record sub-segment.

6. A method for assignment of point level address geocodes to street networks as defined in claim 1 wherein said step of employing includes the further steps of:

determining if said selected best segment record contains shape points which define sub-segments of said selected best segment record;

selecting said sub-segment of said selected best segment record nearest to said selected best point record if said selected best segment record contains shape points which define sub-segments of said selected best segment record;

determining if a right angle projection is possible from said selected best point record to a point on said centerline of said selected nearest sub-segment record; and, employing a data point on said selected best segment record as said centerline point if a right angle projection is not possible from said selected best point record to a point on said centerline of said selected nearest sub-segment record.

7. A method for assignment of point level address geocodes to street networks as defined in claim 6 wherein data points of said selected best segment record include centerline end points and wherein said employed data point on said selected best segment record is an end point of said centerline of said selected best segment record.

8. A method for assignment of point level address geocodes to street networks as defined in claim 6 wherein said data points of said selected best segment record include centerline end points and centerline shape points and wherein said employed data point on said selected best segment record is a shape point of said centerline of said selected best segment record.

9. A method for assignment of point level address geocodes to street networks as defined in claim 1 wherein said step of employing includes the further steps of:

determining if a right angle projection is possible from said selected best point record to a point on said centerline of said selected best segment record; and, employing a data point on said selected best segment record as said centerline point if a right angle projection is not possible from said selected best point record to a point on said centerline of said selected best segment record.

10. A method for assignment of point level address geocodes to street networks as defined in claim 9 wherein data points of said selected best segment record include centerline end points and wherein said employed data point on said selected best segment record is an end point of said centerline of said selected best segment record.

11. A method for assignment of point level address geocodes to street networks as defined in claim 9 wherein data points of said selected best segment record include centerline end points and centerline shape points and wherein said employed data point on said selected best segment record is a shape point of said centerline of said selected best segment record.

12. A method for assignment of point level address geocodes to street networks as defined in claim 1 wherein said step of employing includes the further steps of:

determining if a right angle projection is possible from said selected best point record to a point on said the centerline of said selected best segment record; and, identifying a nearest data point on said selected best segment record if a right angle projection is not possible from said selected best point record to a point on said centerline of said selected best segment record; and, determining if there is a continuation segment record connected to said nearest data point.

13. A method for assignment of point level address geocodes to street networks as defined in claim 12 wherein said step of employing includes the further steps of:

determining if a right angle projection is possible from said selected best point record to a point on said centerline of said selected best continuation segment record if there is a continuation segment record connected to said nearest data point; and, interpolating the location of said centerline point along said continuation segment record if a right angle projection is possible from said selected best point record to a point on said centerline of said continuation segment record.

14. A method for assignment of point level address geocodes to street networks as defined in claim 13 wherein said interpolated location is used as said point on said centerline of said continuation segment record.

15. A method for assignment of point level address geocodes to street networks as defined in claim 12 wherein said step of employing includes the further steps of:

determining if a right angle projection is possible from said selected best point record to a point on said the centerline of said selected best continuation segment record if there is a continuation segment record connected to said nearest data point; and, employing a data point on said selected best segment record as said centerline point if a right angle projection is not possible from said selected best point record to a point on said centerline of said selected best segment record.

* * * * *